United States Patent Office 3,533,930
Patented Oct. 13, 1970

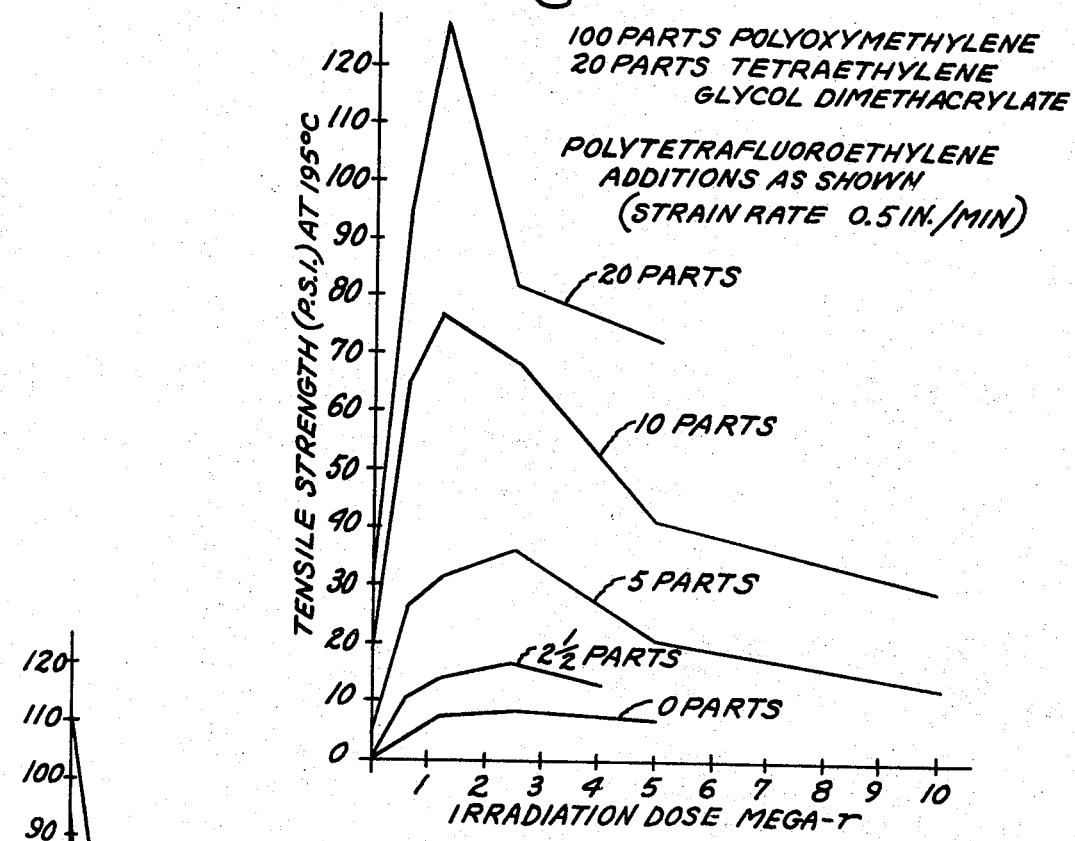
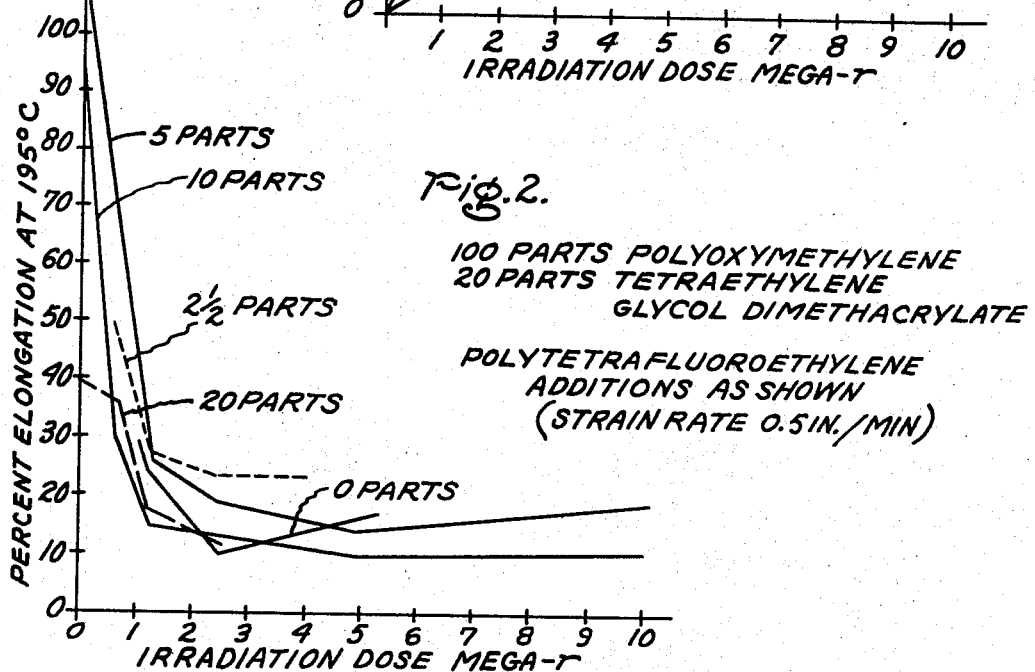

3,533,930
**MODIFIED CROSSLINKED POLYOXYMETHYL-
ENES AND THEIR PREPARATION**
Elliott J. Lawton, Cleverdale, and John S. Balwit, Schenectady, N.Y., assignors to General Electric Company, a corporation of New York
Filed Nov. 21, 1966, Ser. No. 595,732
Int. Cl. B01j 1/10
U.S. Cl. 204—159.15                                    9 Claims

ABSTRACT OF THE DISCLOSURE

This invention is related to irradiated crosslinked polyoxymethylenes and the preparation thereof and, more particularly to the improvement effected therein by the incorporation therein of small amounts of polytetrafluoroethylene producing a material of substantially increased tensile strength at temperatures above the crystal melting temperature. This greater structural integrity enhances the utility of the crosslinked material in arc chute devices, for example. The increase in structural integrity is due to the creation within the polyoxymethylene of a maze of fine threads of polytetrafluoroethylene dispersed therethrough. This polytetrafluoroethylene reinforcement itself has been isolated by extraction and has separate utility as packing and gasket forming material.

---

One of the cheapest and most easily obtained organic compounds is formaldehyde. Formaldehyde monomer is condensed readily to linear polymers (polyoxymethylenes) having thermoplastic properties. These polmers as originally prepared were not used commercially because of their instability and other undesirable properties. Thus even at ordinary temperatuers most of the polymers smell badly of formaldehyde. As the temperature rises, moreover, the solid polymers rapidly soften and frequently depolymerize.

A greatly improved polyoxymethylene described in MacDonald U.S. 2,768,994 overcomes most of the defects noted and has been offered to the trade. This polymer is, however, soluble and fusible, and for some purposes a product which is less thermoplastic and more resistant to solvents is desired.

The aforementioned polyoxymethylenes are still further improved by crosslinking and U.S. Pat. 3,215,671, Melby is specifically directed to the preparation of crosslinked polyoxymethylenes either by (a) exposing to ionizing radiation a polyoxymethylene having intimately mixed or dispersed therein from 0.5 to 20 percent by weight (of the polyoxymethylene) of selected polyunsaturated compounds, or (b) exposing to ultraviolet light a polyoxymethylene having intimately dispersed therein from 0.5 to 20 percent by weight (of the polyoxymethylene) of selected polyunsaturated compounds and from 0.01 to 5 percent by weight of a photo-initiator .

As stated in the U.S. Pat. 3,215,671, crosslinked polyoxymethylene by whatever process it may be prepared is characterized by having a plurality of covalently bonded linkages —Q— between catenarian carbon atoms of polyoxymethylene chains, in which Q is a bridging means. The extent of crosslinking (i.e., the plurality of the bridging means Q is preferably such that at least 30% of the polymer composition remains undissolved when a film thereof of 5–8 mils thickness is immersed in one hundred times its weight of boiling dimethylformamide for two minutes.

Low levels of irradiation must be employed in the crosslinking of polyoxymethylenes to avoid degrading this material. Polytetrafluoroethylene is another polymer that is easily degraded by exposure to ionizing radiation. Significant degradation of polytetrafluoroethylene will occur at irradiation dosages that also significantly degrade polyoxymethylenes. It has been found not only that the incorporation of relatively small amounts of polytetrafluoroethylene into crosslinked polyoxymethylene can advantageously be effected to produce material of improved tensile strength at temperatures above the crystal melting temperature of the polyoxymethylene, but that optimum strengths are produced most economically, bacuse the crosslinking of the mixture is succesfully accomplished using low levels of irradiation.

It is, therefore, the prime object of this invention to produce a modified polyoxymethylene having a substantially increased tensile strength at 195° C. and to provide a method for the preparation thereof.

The improved polyoxymethylene of this invention is prepared by intimately mixing a comparatively small amount of polytetrafluoroethylene together with the linear polyoxymethylene to be crosslinked and the appropriate polyunsaturated compound, subjecting the mixture to low level irradiation and then annealing the crosslinked material at a temperature near $T_m$ the crystal melting temperature ($T_m = 177°$ C.) of polyoxymethylene.

The exact nature of this invention as well as other objects and advantages thereof will be readily apparent from consideration of the following specification relating to the annexed drawing in which:

FIG. 1 shows the effect of adding varying amounts of polytetrafluoroethylene on the tensile strength of polyoxymethylene at 195° C. and FIG. 2 shows the effect of these same additions on the ultimate elongation at 195° C. of crosslinked polyoxymethylene both unmodified and modified in accordance with this invention.

As may be seen on FIG. 1, the addition of 20 parts by weight of polytetrafluoroethylene to 100 parts by weight of the polyoxymethylene increases the tensile strength from less than 10 p.s.i. to more than 125 p.s.i. with the optimum effect being produced for all mixtures at irradiation doses of less than about 2.5 mega-roentgens (this expression is usually abbreviated as "mega-r," the roentgen being roughly equal to radiation dosage expressed as a "rad").

FIGS. 1 and 2 may be employed together to select the amount of polytetrafluoroethylene to be added and the irradiation dose to be employed for a given application for which an assessment has previously been made of the allowable elongation and the requisite tensile strength.

Even small amounts of polytetrafluoroethylene added to the polyoxymethylene exert a pronounced beneficial effect on the hot-tensile strength thereof.

As is indicated in U.S. 3,215,671, incorporated herein by reference, the polyunsaturated compounds found most suitable for crosslinking polyoxymethylenes are acid derivatives of the class consisting of esters, amides and imides containing at least two nonadjacent ethylenic ($>$C$=$C$<$) groups, said ethylenic groups being in a terminal position or in conjugation with the oxo oxygen atom in an amide, imide or ester group. These same polyunsaturated compounds are useful in varying degrees of crosslinking efficiency in the practice of the instant invention.

Thus, there may be employed esters, such as allyl acrylate, allyl methacrylate, methylene dimethacrylate, ethylene dimethacrylate, triethylene glycol dimethacrylate, diallyl maleate, diallyl phthalate, ethylene glycol bis-(allyl carbonate), resorcinol dimethacrylate, triallyl cyanurate, and pentaerythrityl tetramethacrylate; amides, such as allyl acrylamide, allyl methacrylamide, and N,N'-methylenediacrylamide; and imides, such as 2,4-tolylenedimaleimide, 1,4-cyclohexylenedimaleimide, and m-phenylenedimaleimide.

The preferred compounds can be represented by the formula $R(XY)_n$, where R is a hydrocarbon or oxygen-interrupted hydrocarbon radical (including aliphatic, cycloaliphatic, arylaliphatic and aromatic radicals with usually not more than 15 carbons), X is

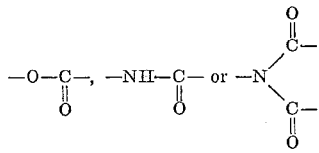

Y is an ethylenically unsaturated hydrocarbon group in which the ethylenic double bond is either terminal or conjugated with a C=O group in X, and n is at least 2. Although not critical, n is preferably not above 6.

Polyoxymethylenes suitable as starting materials in the process of this invention and which are mixed with the polyunsaturated compounds and the polytetrafluoroethylene powder are those having polyoxymethylene chains of at least 100 formaldehyde units in length. All polyoxymethylenes of this length and over may be employed, where the chains are terminated by hydroxyl groups, ether groups, methyl groups, carboxylate groups or other groups. Thus, there may be employed α-polyoxymethylene, β-polyoxymethylene, and the higher molecular weight polyoxymethylenes, such as eu-polyoxymethylene, as described by J. F. Walker in "Formaldehyde," second edition, Reinhold Publishing Corporation, 1953, pages 129–146.

Preparation of polyoxymethylenes employed in the specific examples shown below is described in U.S. 3,215,671 referred to hereinabove.

Suitable ionizing radiations for use in this process include both radiation in the form sometimes regarded as particle radiation and radiation in the form sometimes regarded as ionizing electromagnetic radiation.

By particle radiation is meant a stream of particles such as electrons, protons, neutrons, alpha-particles, deuterons, beta-particles, or the like, so directed that the said particle impinges upon the composition being irradiated. The charged particles may be accelerated by means of a suitable voltage gradient, using such devices as a cathode-ray tube, resonant cavity accelerator, a Van de Graaff accelerator, a Cockcroft-Walton accelerator, or the like, as is well known to those skilled in the art. Neutron radiation may be produced by suitable nuclear reactions, e.g., bombardment of a beryllium target with deuterons or alpha-particles. In addition, particle radiation suitable for carrying out the process of this invention may be obtained from an atomic pile, or from radioactive isotopes or from other natural or artificial radioactive materials.

By ionizing electromagnetic radiation is meant radiation in the form of photons of the type produced when a metal target (e.g., gold or tungsten) is bombarded by electrons possessing appropriate energy. Such radiation is conventionally termed X-ray. In addition to X-rays produced as indicated above, ionizing electromagnetic radiation suitable for carrying out the process of the invention may be obtained from a nuclear reactor ("pile") or from natural or artificial radioactive material. In all of these latter cases the radiation is conventionally termed gamma rays.

It is recognized that the energy characteristics of one form of ionizing radiation can be expressed in terms which are appropriate for another form. Thus, it is acceptable to refer to energy equivalents between, for example, radiation commonly considered as particle radiation and radiation commonly considered as wave or electromagnetic radiation. Radiation with energy equivalent to a beam of electrons of 0.1 to 10 mev. energy is preferred. Radiation with higher energies (i.e., 10 mev. and higher) may also be employed.

The dosage, or quantity, of radiation absorbed by the polyoxymethylene/polyunsaturated crosslinking agent/polytetrafluoroethylene composition in the process of this invention should be at least 0.1 mega-r (about 100,000 rads) to produce useful amounts of crosslinking. One rad is the quantity of radiation which will result in an energy absorption of 100 ergs per gram of irradiated material. It is desirable to avoid excessive amounts of irradiation. The tendency of unmodified polyoxymethylene and of polytetrafluoroethylene to degrade under ionizing radiation has been noted above. Degradation represents a process which appears to compete with the crosslinking process of this invention, and irradiation in excess of about 5 mega-r causes bubbles to form in the crosslinked composite during the high temperature anneal. The behavior of different polyoxymethylene/polyunsaturated crosslinking agent/polytetrafluoroethylene combinations is shown in Table I, wherein the degrading threshold is set forth under the column heading "bubble-dose".

TABLE I.—RELATIVE CROSSLINKING EFFICIENCY OF DIFFERENT MONOMERS IN 100/10/20 DELRIN/TEFLON/MONOMER MIXTURES
[Irradiation dose 1.25 mega-r]

| Unsaturated monomer | Tensile at 195° C., p.s.i. | Percent elongation at 195° C. | "Bubble-dose" (mega-r) |
|---|---|---|---|
| Tetramethylene diacrylate (TMeA) | 82 | 24 | 5. |
| Tetraethylene glycol dimethacrylate (TEGMA) | 75 | 15 | 5. |
| Triethylene glycol dimethacrylate (TriEGMA) | 65 | 10 | 2.5 |
| thylene glycol dimethacrylate (PEGMA) | 50 | 19 | 5. |
| Diallyl fumarate (DAF) | 44 | 34 | 2.5 |
| Diallyl Maleate (DAM) | 27 | 52 | 2.5 |
| Triallyl aconitate (TAAc) | 13 | 42 | 0.33 |
| Diallyl Phthalate (DAPh) | 8 | 59 | 0.61 |
| Mixture—Not irradiated | ~12 | ~90 | >5. |

In each of the series of experiments shown above the starting formulation was 100 parts of weight of polyoxymethylene, 10 parts by weight of polytetrafluoroethylene powder and 20 parts by weight (starting of the polyunsaturated monomer. A mixture of the polyoxymethylene and the polytetrafluoroethylene was prepared by milling at about 180° C. for a period of from about 10 to about 15 minutes or until the mixture appeared to be uniform or homogeneous. At this temperature the polyoxymethylene distributes itself on a milling roller with the consistency of a putty and the polytetrafluoroethylene is sprinkled thereover. Late in the milling operation the polyunsaturated crosslinking agent was added to the mixture of polyoxymethylene and polytetrafluoroethylene. Of course, the amount of polyunsaturated monomer retained in the mixture would be less than the starting amount and would differ in each case, because each of these monomers has an appreciable vapor pressure different from all the others. The polyoxymethylene-polyunsaturated monomer-polytetrafluoroethylene mixture was formed into sheets by pressing at about 180° C., the sheets being about 0.02 inch thick. A temperature of 195° C. (deliberately chosen above the crystal melting temperature) was selected as the temperature for determining tensile strength measurements. The sheeted samples were irradiated to different dose levels at room temperature (about 23° C.) and annealing thereof at about 180° C. to release trapped radicals was carried out in the tensile test oven prior to the conduct of the tensile measurement. The ultimate tensile strength and elongations tabulated are for sheeted samples irradiated to a constant dose level of 1.25 mega-r. Comparison is also afforded to the non-irradiated sheeted samples by the inclusion in Table I of the average tensile strength and elongation values therefor. The tensile strength of about 12 p.s.i. was due to the presence of the 10 parts by weight of polytetrafluoroethylene, which was found to have a profound effect on the viscosity of the polyoxymethylene at 195° C. The nonirradiated sheeted samples did not possess form stability at 195° C., they shriveled during heating and pulled out into a long thread upon breaking. As may be determined from Table I the most effective polyunsaturated monomers are the acrylates and methacrylates and the allyl types are the least effective.

Examination of the sheeted samples has established that the polytetrafluoroethylene actually added in the form of a power is converted to a maze of fine fibers of polytetrafluoroethlene dispersed throughout and entangled within the body of polyoxymethylene. Apparently the formation of these fibers occurs during the milling operation at elevated temperature and the fibers retain their reinforcing capacity in spite of radiation exposure, which is known to have a degrading effect upon polytetrafluoroethylene. Continued milling after the mixture has acquired the appearance of homogeneity does not noticeably improve the fiber formation, however, if the milling action proceeds for too long, degradation of the polyoxymethylene occurs.

By high temperature form stabilizing polyoxymethylenes the practice of this invention effectively extends the utility of these materials to such structural components operable at elevated temperatures as, for example, gears and bearings. Journals prepared of polyoxymethylene modified in accordance with this invention have the added advantage of being self-lubricating.

If the item prepared from polyoxymethylene modified in accordance with the teachings set forth herein is not to be used at all for some period of time as may be the case when the item is stored, or, if exposure to a temperature near or over $T_m$ is not contemplated for an extended peroid it is preferred that the item be annealed by being carried to a temperature at least near or over $T_m$.

The amount of polytetrafluoroethylene that may be used should vary from a small amount (less than about 2½% by weight of polyoxymethylene) to as much as 50% by weight of the polyoxymethylene depending on the ultimate high temperature use of the modified, crosslinked material.

For some reason as yet undetermined certain of the sheeted samples improved in the 195° C. tensile strength, when they were allowed to age at room temperature for from 1 to 7 days before irradiation thereof. There was a small increase in tensile strength at 195° C. by aging the 100/10/20 mixtures (parts by weight of polyoxymethylene, polyunsaturated monomer, polytetrafluoroethylene, respectively) using diallyl maleate and polyethylene gylcol dimethacrylate; there was no apparent effect by aging on the tensile strength at 195° C. using tetramethylene diacrylate, triethylene glycol dimethacrylate, diallyl phthalate and triallyl aconitate, and there was a pronounced effect (an increase by a factor of at least two) by aging on the tensile strength at 195° C. using tetraethylene glycol dimethacrylate and diallyl fumarate. Further study with 100/20/20 mixtures using the last mentioned polyunsaturated monomers indicated that an aging period of 2-4 days at room temperature prior to irradiation was most beneficial. It is theorized that this aging effect may be associated with diffusion of monomer into the fibrous polytetrafluoroethylene component resulting in crosslinking between this component and the polyoxymethylene component or perhaps may influence the recrystallization and orientation of monomer and polymer chains to a more favored position with respect to each other.

Examination of the "bubble-dose" for the various combinations listed in Table I discloses that for the two polyunsaturated monomers (diallyl phthalate and triallyl aconitate) that promote crosslinking to the smallest degree, the "bubble dose' is very low (0.3–0.6 mega-r), whereas for the most effective polyunsaturated monomers the "bubble dose" is comparatively high (5 mega-r).

The advantages of crosslinked unmodified polyoxymethylenes over corresponding uncrosslinked polyoxymethylenes are illustrated in U.S. 3,215,671 with specific reference to the capacity to draw filaments, prepare thread, and weave or knit fabrics from the crosslinked material.

These advantages, of course, are also available with the crosslinked polyoxymethylene modified according to this invention, however, perhaps, the most important feature of this invention is the provision of structural reliability in the modified polyoxymethylene.

Verification was made of the distribution and nature of the polytetrafluoroethylene reinforcement in the irradiation crosslinked polyoxymethylene. Thus, samples of the unirradiated sheeted material prepared both with and without the addition of crosslinking monomer were submerged in hot benzyl alcohol to remove the polyoxymethylene matrix and then rinsed and dried. Any solvent that will dissolve the polyoxymethylene or materials, as for example, sulfuric acid, which will remove the polyoxymethylene by degradation, could be used for this process. In the case of the hot benzyl alcohol both the solvent and extracted polymer can be reclaimed and reused. After leaching away all traces of foreign matter, a relatively uniform sheet consisting of a continuous mat of very fine threads of polytetrafluoroethylene was produced. The mat was actually a soft non-woven light weight polytetrafluoroethylene fabric, which was remarkably strong.

In the case of a mix of 150 parts by weight of polyoxymethylene and 97 parts by weight of polytetrafluoroethylene powder formed by milling for about 10 minutes and then pressed into a sheet 30 mils thick, the polytetrafluoroethylene mat prepared therefrom was about 21 mils in thickness.

Other shapes, other than sheets, can be prepared by which to prepare the polytetrafluoroethylene fabric in desired forms determined by the shape prior to extraction of the matrix. As an example, a 25-foot length of highly oriented polytetrafluoroethylene yarn was produced by extraction from an extruded rod that had in turn been produced from a hot-milled uniform mixture of 47 parts by weight polytetrafluoroethylene powder and 100 parts by weight of polyoxymethylene. The average diameter of the yarn was about 50 mils, while the extruded rod was about 60 mils in diameter.

For the purpose of preparing the unusual polytetrafluoroethylene mat described herein, mixes having as high as 50% by weight of polytetrafluoroethylene were employed. Thus, a 25 mil thick film was pressed from a hot milled mix of equal parts by weight of polytetrafluoroethylene and polyoxymethylene. After extraction of the polyoxymethylene, the resulting polytetrafluoromethylene mat remained at the 25 mil thickness, the bulk density of this material being about 0.92 gm./cc. (solid polytetrafluoroethylene has a density of 2.19 gms./cc.). Very thin low bulk density mat was produced by extracting a 21 mil thick film made from a hot pressed mixture of 5 parts by weight polytetrafluoroethylene and 100 parts by weight polyoxymethylene. The mat of polytetrafluoroethylene produced had a thickness of 2 mils and had a bulk density of about 0.5 gm./cc.

Similar polytetrafluoroethylene mats were formed from the milled mixture of polytetrafluoroethylene powder and polyethylene oxide. However, polytetrafluoroethylene mats produced by the described method using low density polyethylene, high density polyethylene, polyvinyl ether, polyvinyl alcohol and an elastomeric copolymer of ethylene and propylene in place of the polyoxymethylene matrix were found to be of inferior quality.

The fibers in the mat are of relatively uniform diameter (less than 1 micron), the relative uniformity possibly being due to the relatively narrow range of sizes (average size about 35 microns) of the polytetrafluoroethylene powder.

Therefore, polytetrafluoroethylene-reinforced and irradiated crosslinked polyoxymethylene having improved high temperature properties and a process for the preparation thereof wherein substantially all of the particles of polytetrafluoroethylene are drawn into very thin long fibers extending throughout and entangled in the mass by subjecting the mass to combined shearing and massaging action (as by milling) has been disclosed. Obviously modification may be made in the process conditions taught herein or the means for effecting the polytetrafluoroethylene fiber formation and it is to be understood that within the scope of the appended claims, this invention may be practiced otherwise than as specifically described.

What we claim as new and desired to secure by Letters Patent of the United States is:

1. A process for crosslinking linear polyoxymethylene, which comprises:

subjecting a mixture consisting of (a) linear polyoxymethylene having a chain at least 100 oxymethylene units in length, (b) about 0.5–20% by weight of an acid derivative selected from the class consisting of esters, amides and imides containing at least two non-adjacent ethylenic ($>C=C<$) groups, said ethylenic groups being selected from the class consisting of terminal ethylenic groups and nonterminal ethylenic groups conjugated with oxo oxygen supplied by a member of the class consisting of ester, amide and imide groups and (c) a minor proportion by weight of powdered polytetrafluoroethylene to combined shearing and massaging forces, forming said sheared and massaged mixture into a desired configuration, subjecting said configuration to between about 0.1 mega-r and 5 mega-r of ionizing radiation having a minimum energy of about 100,000 electron volts, and annealing the irradiated configuration at a temperature approximating the crystal melting temperature of the linear polyoxymethylene.

2. The process for crosslinking polyoxymethylene substantially as recited in claim 1 wherein the shearing and massaging force are applied at about 180° C.

3. The process for crosslinking polyoxymethylene substantially as recited in claim 1 wherein the annealing step is conducted at about 180° C.

4. The process for crosslinking linear polyoxymethylene substantially as recited in claim 1 wherein the acid derivative is tetramethylene diacrylate.

5. The process for crosslinking linear polyoxymethylene substantially as recited in claim 1 wherein the acid derivative is tetraethylene glycol dimethacrylate.

6. The process for crosslinking linear polyoxymethylene substantially as recited in claim 1 including the step of aging the configuration formed for a period of at least one day prior to the irradiation thereof.

7. The process for crosslinking linear polyoxymethylene substantially as recited in claim 6 wherein the acid derivative is selected from the group consisting of diallyl fumarate and tetraethylene glycol dimethacrylate.

8. The process for crosslinking linear polyoxymethylene substantially as recited in claim 1 wherein the amount of polytetrafluoroethylene is in the range of from about 2½% to about 50% by weight of the weight of polyoxymethylene.

9. In a crosslinked polymer wherein linear polyoxymethylene chains at least 100 oxymethylene units in length are bridged together by about 0.5–20% by weight (based on the weight of polyoxymethylene) of divalent radicals —Q— resulting from reaction of the chains with an acid derivative selected from the class consisting of esters, amides and imides containing at least two nonadjacent ethylenic ($>C=C<$) groups, said ethylenic groups being selected from the class consisting of terminal ethylenic and nonterminal ethylenic groups conjugated with oxo oxygen supplied by a member of the class consisting of terminal ethylenic and nonterminal ethylenic groups conjugated with oxo oxygen supplied by a member of the class consisting of ester, amide and imide groups, the improvement comprising an irridated, annealed, crosslinked polymer composition having solid fibers of polytetrafluoroethylene dispersed throughout and entangled with the crosslinked polyoxymethylene, the polytetrafluoroethylene content ranging from about 2.5 to about 50% of the weight of polyoxymethylene and the fibers having relatively uniform diameters of less than one micron, said polymer composition having been prepared by the process of claim 4.

References Cited

UNITED STATES PATENTS

| | | | |
|---|---|---|---|
| 2,710,290 | 6/1955 | Safford et al. | 260—41 |
| 3,005,795 | 10/1961 | Froemming et al. | 260—900 |
| 3,215,671 | 11/1965 | Melby | 260—67 |
| 3,287,288 | 11/1967 | Reiling | 260—4 |

MURRAY TILLMAN, Primary Examiner

C. J. SECCURO, Assistant Examiner

U.S. Cl. X.R.

161—169; 260—900; 264—127